US005566594A

United States Patent [19]
Michlin

[11] Patent Number: 5,566,594
[45] Date of Patent: Oct. 22, 1996

[54] LONG LIFE RE-RULABLE STEEL RULE DIE SYSTEM

[76] Inventor: Steven B. Michlin, 5310 Bentley Suite 105, West Bloomfield, Mich. 48322

[21] Appl. No.: 147,493

[22] Filed: Nov. 5, 1993

[51] Int. Cl.$^6$ ................................................. B21K 5/20
[52] U.S. Cl. ........................................ 76/107.8; 83/698.71
[58] Field of Search ................................ 76/107.8, 107.1; 83/698.71, 652, 699.11, 698.91, 684, 164

[56] References Cited

U.S. PATENT DOCUMENTS

| | | | |
|---|---|---|---|
| 2,230,778 | 2/1941 | Flores | 83/98 |
| 2,885,913 | 5/1959 | Lescallette | 76/107.8 |
| 3,745,857 | 7/1973 | Harman | 76/107.8 |
| 3,872,744 | 3/1975 | Fauth | 76/107.8 |
| 4,074,595 | 2/1978 | Sauer et al. | 76/107.8 |
| 5,140,872 | 8/1992 | Holliday et al. | 76/107.8 |
| 5,197,367 | 3/1993 | Holliday | 83/698.91 |

*Primary Examiner*—Kenneth E. Peterson

[57] ABSTRACT

A re-rulable steel rule die frame is made from metal. Slots are cut in the metal die frame for receiving the blades of the steel rule. In one embodiment, the frame is a block of metal and the slots are cut such that the slots do not go completely through the frame. The blades are placed in the slots to form the desired cutting configuration. The edges of the blades opposite the cutting edges rest on the metal bottoms of the slots. The corners or ends of the blades are joined by welding, brazing or soldering without danger of burning the metal frame. In another embodiment, computer-directed laser beams cut precise slots in multiple layers of metal. The multiple layers are then joined together so the slots align, providing a precisely cut metal-framed steel rule die of a thickness able to withstand repeated stress. A modification of this embodiment allows the cut material to fall through the die. The desired shape is precisely cut in each frame layer, forming openings through each layer. The layers are joined together so the openings align. The steel rule blades are brazed to the metal frame layers around the perimeter of the formed opening. When the material is cut it falls through the frame. As an alternative to the openings, compressed air ejection system is used to remove the cut work piece from the die frame.

5 Claims, 4 Drawing Sheets

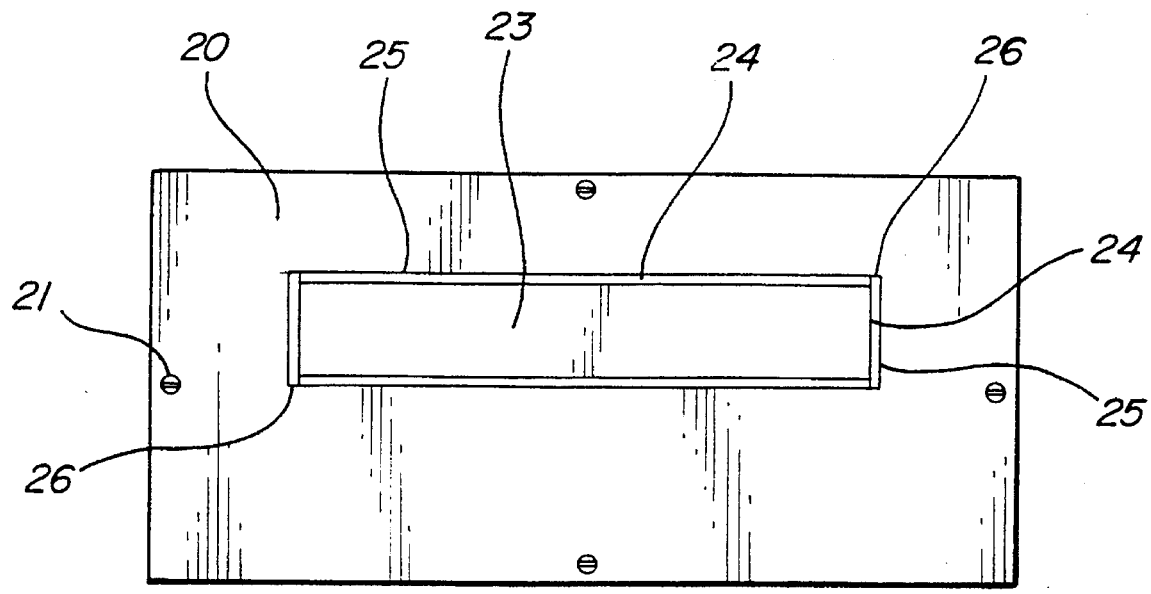
FIG - 5
FIG - 6
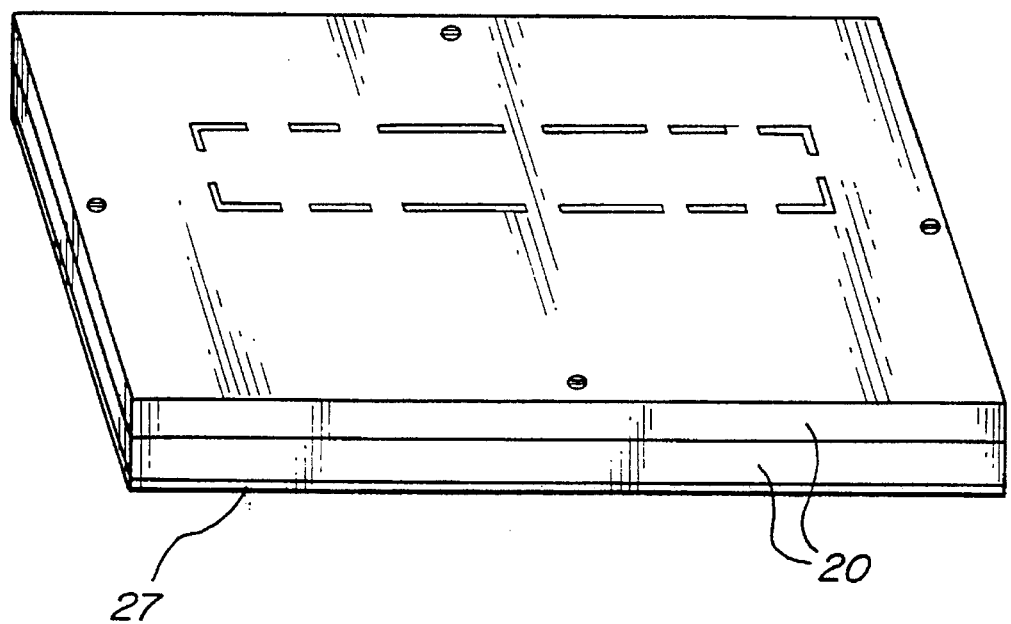

LONG LIFE RE-RULABLE STEEL RULE DIE SYSTEM

BACKGROUND OF THE INVENTION

This invention relates to a system of steel rule die construction that has several advantages over contemporary systems available. There have been many problems in steel rule die construction. In this industry, wood has become the standard die frame material for several reasons. First, it is easy to work with. Most die manufacturers use birch or maple. For structural strength they have traditionally used these woods in multiple laminated layers with opposing grain in order that the wooden structure frame will hold up to constant daylong stress of tonnage pounding on the blades. This wooden frame has been the accepted standard for years as steel rule diemaking is an age old art.

The use of wooden frames has had some advantages over other types of dies. The first major advantage is that they are inexpensive to manufacture. They are also quick to manufacture. Wooden frames are light and easy to store, easy to handle and easy to re-rule. Re-ruling consists of removing the blades after they get worn and replacing them with fresh blades. Once the old blades are removed, re-ruling is essentially the same as installing the blade the first time. However, as the dies are used and blades are removed, the tight fit of the blades inside the wooden frame gets looser and eventually, for dies where the tolerance of the cut is important, the blades fit loose enough that the cut is outside the desired tolerance. At this point, the die frame can no longer be used and a new frame must be constructed.

Here is how wooden die frames are manufactured in a typical situation. First the image is generated on a computer (although some facilities still draw the cut locations with a pencil and ruler)and then the image of where cuts are to be made is printed directly on the wood with a CalComp plotter. Then, typically, the holes are drilled where necessary in the wood as printed by the plotter. Holes are required for structural purposes. Without these holes, the die would fall apart. For example, if blades in a rectangular design were desired and the entire rectangle was cut out in the wood, a wooden rectangle would be removed from the wood. This is undesirable, since this would not hold the blade material in on both sides. So, in order to cut a rectangular groove in the wood, small holes are cut, spaced around one quarter inch apart, called bridges, between which no cut is made. The blade material is notched over this quarter-inch bridge where the blade material in the notch region rests on top of the wooden uncut region, between the one quarter inch holes. The grooves are cut everywhere in the rectangle, all the way through the wood, except between the holes over several such one quarter inch bridges. Then a notched blade is placed in the grooves for the complete rectangle, the notched portions of the rule going in these one quarter inch bridge sections.

In a typical diemaking facility, after the holes are drilled on the wooden frames with the cut-lines drawn on with a CalComp plotter, these holes are used by the jigsaw operator to start cutting the grooves. In the diemaking industry, quick-connect table jigsaws are used and these holes are the connect/unconnect points where the jigsaw blade restarts. The operator of such a jigsaw needs a very good hand and a very good eye, because the skill of the jigsaw operator determines the quality of the steel rule die. Since the thickness of the cut has a tolerance that is very tight, because the blades must fit tight, a jagged cut can in some cases cause a blade not to fit in the groove. The steel rule die manufacturing industry has several standardized blade sizes typically used with precise thickness and precise width. Therefore, the steel rule diemaking business has available different thickness jigsaw blades for each dieblade thickness.

However, if a jigsaw operator is innacurate, one might wind up with a variation in the dimensions of the die from one time to another. This would not be acceptable if a tight tolerance of a specific die is needed. As a result, the computer controlled laser cutting technique has evolved for wooden steel rule die manufacturing. In a typical application for cutting wood dies with great accuracy, a CNC machine controls a laser beam that cuts into the wood. It is used to cut the wooden die-board with computer numerical control. Even the thickness of the cuts may be controlled with great accuracy. Some laser cutter devices of this type use carbon dioxide gas in the laser beam. The gas is pumped into a tube into which the voltage hyperaccelerates causing laser light when the gas is excited to a higher level, thus emitting photons of laser light. Different lasers use different gases such as carbon dioxide, Argon, and other gases. Other laser cutters use different mechanisms. In any case, by using the CNC to control the laser beam, in conjunction with appropriate software, near-perfection may be achieved. Repeatability may be achieved. Most dieboards are at least five eighths of an inch to three quarters of an inch thick. Some are greater in thickness. Because the maximum thickness you may cut "cleanly" with a laser beam using this technique is around three eighths of an inch thick, metal has not been a choice in the board material and the old wood standard has been kept up. However, by using two or more layers of metal, each cut using the same software commands, will be so nearly identical that they may be "layered" to achieve the thickness desired in this invention, as will be seen in a later section. Thus, in this invention, the computer controlled laser may now be used to make metal dieboards, the advantages which will be later pointed out. With this manufacturing technique, a jigsaw operator has been replaced with a laser beam. It is similar to putting a laser beam generator on the calcomp plotter. When the computer controlled laser beam is used, once a pattern is stored in a computer file, it may be reproduced any number of times, and it will generate the same image every time. When using this cutting technique for manufacturing the wooden frames, the one quarter inch spaced "holes" aren't necessary for starting and stopping the jigsaw cut. The one quarter inch bridges of no cut are made without the holes, and thus a die may be manufactured with the same properties as the older style steel rule dies, on wooden frames, but with great precision, duplicability and efficiency.

However, wooden frames have some disadvantages. With wooden frames, there is difficulty splicing the metal blades in the die together without special equipment. For example, a spot welder can splice well without accidentally dulling the sharp blade. But if a normal welder is used by a manufacturer who does not have a spot welder, the normal welder will cause burning in the wooden frame. If one tries to braze or solder the blades when splicing, which is often needed at corners where the metal ends join, the wooden frame can get visible black burn marks. If one has to rebraze in the event of an error on the part of the brazer, then the black burn spot gets more pronounced. When the blades of a die become dull, one may typically rerule the die with fresh blade material. When re-ruling, if one needs to solder again, weld again, or braze again where two blades join, at corners or when spliced, the burn marks will shorten the life of the re-rulability of the frame. Frame life is also shortened by the blades opening the blade slots in the wood wider as the result of many cycles of force or pressure of the blades against the frame during use over time. Some of this may be attributed to wood compression at the rule cut line, causing the rule cut line to widen. When the blade slots in the wood open up and become wider than the blade, the blade might move with respect to the wooden frame and cause an uneven location of the cutting edge of the blade. It also decreases the life of the wooden frame when re-rulability of the frame is desired.

With this minimal ability of joining blades at corners, thicker blades have been required in die design than desired instead of brazing, soldering or welding. If the capability existed of extensive heat-related joining means at the corners where blades join, thinner blades could be used instead of thicker blades. By providing the thinner blades with a strong attachment at the corners, structural strength could be added to the die. Oftentimes, blades are touching. at the corners, just set in place. This requires a heavier than normal blade material which is more expensive, harder to work with (in terms of bending, cutting, and notching) and requires a thicker groove, which significantly adds to the cost, especially of the computer laser beam cut material. The advantage of using thinner blades is that significantly less expensive equipment is required in notching, cutting, and bending. Thinner blades are easier to handle, easier to work with, and put less pressure on the cut frame material. For example, when cutting Lexan polycarbonate plastic using steel rule dies, long narrow pieces may have longitudinal ridges that may be reduced with thinner blade material. The thinner the blade material used in the die, the less pressure the blade makes on the material after the cut, and consequently, less deformity of the material.

The basic equipment used in steel rule assembly is simple. First, a cutting device is used for quick cuts. Second, a bending device is used. Different dies may be used in the bending device to achieve square bends, partially round bends, various arc sizes and other similar bends. Third, an aftercut trimming device called a mitre is often used by a diemaking production line for slightly angling and "aftercut" of the steel rule material. This is done after the cut. The reason this tool is important is because it trims the blade material so that the sharp blade touches the sharp blade in the corners. If there should be a gap on the upper surface where blade does not touch blade, the steel rule die would not make a clean cut and would not operate efficiently. Fourth, a notching tool is used to make quick but precise notches in the structural bottom non-cutting portions of the blade, bridges, usually around one quarter inch long. This tool cuts notches in seconds.

Another problem in steel rule die making is ejection. Generally, rubber or other resilient material is used to eject the material after the cut is performed. The rubber acts like a spring. The part ejects. One problem is that some materials are too hard or too soft fox the application. The choice of the correct rubber is important. However, some of the softer rubbers have the inherent problem that they lose resiliency after being pounded on continuously with tons of force. Consequently, extra labor must be used to replace the rubber on a periodic basis in some cases in the use of steel rule dies. However, it would be even better if the material would "fall through" the steel rule die without requiring rubber replacement and without requiring ejection. Some dies have been developed that have this feature, but these dies are very expensive to make.

Still another problem encountered in the steel rule die industry is that the bottom of the metal blades, the dull side, can tend to move with respect to the wooden frame. When the bottom moves, the cutting edge of the blades no longer are at the same height for cutting. This can cause serious difficulty in performance of the die. One of the symptoms of this problem is uneven cuts and in many cases, not all the blade will cut through the work material when the die is used.

SUMMARY OF THE INVENTION

Accordingly, it is an object of this invention to construct a steel rule die system that has great precision, near perfect repeatability, and low cost, all at the same time.

Another object of the invention is to construct a steel rule die that is not only re-rulable, but is re-rulable for a greater lifespan than a wooden frame die.

A further object of this invention is to provide a steel rule die where the frame of the steel rule die is made of metal. The die may then be easily welded, brazed or soldered (or other heat method) when splicing or joining the corners or edges of blades without burning the frame. Thus, less specialized joining or welding equipment may be used to save on costs of manufacture and equipment overhead.

A still further object of this invention is to construct a steel rule die in which the work material falls through the die after being cut, eliminating the need for rubber in the die to spring the material out of the die. This saves the press operator much time.

One embodiment for carrying out this invention has the die frame formed from a block of metal. Straight grooves or slots are cut in the block using a vertical mill machine. The slots do not go completely through the frame. The blade material fits in the slots, resting on the metal bottom of the slots. So a steel rule die is provided where notching the bottom of the blade material is unnecessary.

In a second embodiment of this invention, the frame is made of multiple layers of metal joined together, each layer individually slotted with great precision using a computer-directed laser beam, and the slots of each layer aligned. The cut slots are so precise that the steel rule blades will fit through more than one layer of metal to arrive at the desired frame thickness necessary to support the steel rule blades. The slots may be cut such that an opening is formed in the metal die frame. The blades in this case would be brazed or otherwise attached to the perimeter of the opening, so when the work material is cut by the steel rule die it falls through the die frame. As an alternative to the opening, permanent passages may be drilled in the metal die frame, through which blasts of air may be sent to propel the work material from the die frame.

BRIEF DESCRIPTION OF THE DRAWINGS

This invention, together with other objects, features, aspects, and advantages thereof, will be more clearly understood from the following description, considered in conjunction with the accompanying drawings.

FIG. 5 illustrates a modification of the FIG. 4 embodiment wherein the cut material falls through the die.

FIG. 6 shows the die frame with a metal plate attached to the underside of the layers to prevent blade loosening.

COMPLETE DESCRIPTION OF THE PREFERRED EMBODIMENT

Figure 1:
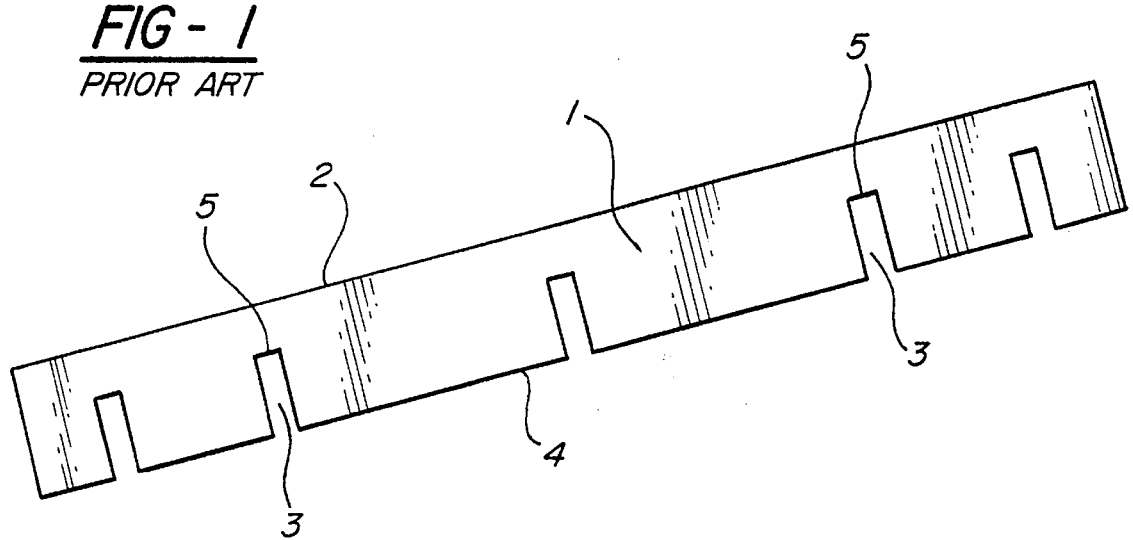
FIG. 1 shows a conventional notched blade for use in a steel rule die.

FIG. 1 shows a conventional notched blade 1 for use in a steel rule die system. The blade 1 has a cutting edge 2. Notches 3 are cut in the edge 4 of the blade 1 opposite the cutting edge 2. The notches 3 have a surface 5 for resting on the steel rule die frame.

Figure 2:
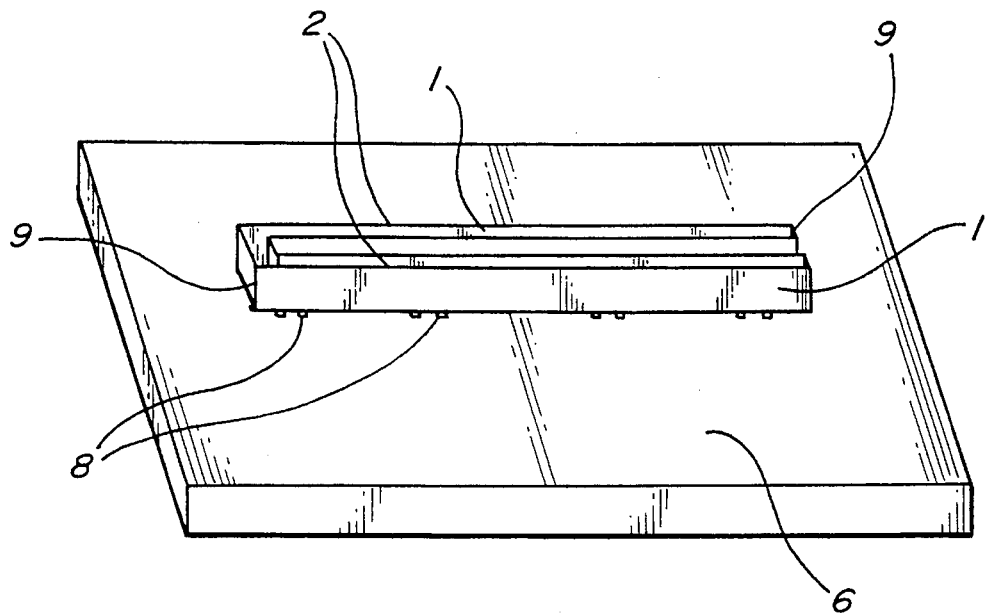
FIG. 2 is a broad illustration of a conventional wooden die frame.

A broad illustration of a conventional steel rule die system is shown in FIG. 2. The steel rule die comprises a wooden frame 6. Slots 7 are cut into the frame 6 for receiving the blades, which may be of various sizes and bent shapes of the blade 1. The slots 7 are generally cut by first providing an image of the desired blade configuration on the wooden frame 6. Holes 8 are drilled in the frame 6 as starting points for the jigsaw blades used to cut the slots 7. No cut is made in the wooden frame 6 between the holes 8 at the bridges, corresponding to the locations of the notches 3 on the blades. When the blades are fitted into the slots 7 of the frame 6, the surfaces 5 of the notches 3 rest on these uncut portions, preventing the blades from falling through the die. If the blades of the die are not bent to the desired configuration, the blades are spliced or joined together at the ends or corners 9 by heating methods such as welding, brazing or soldering.

Figure 3:
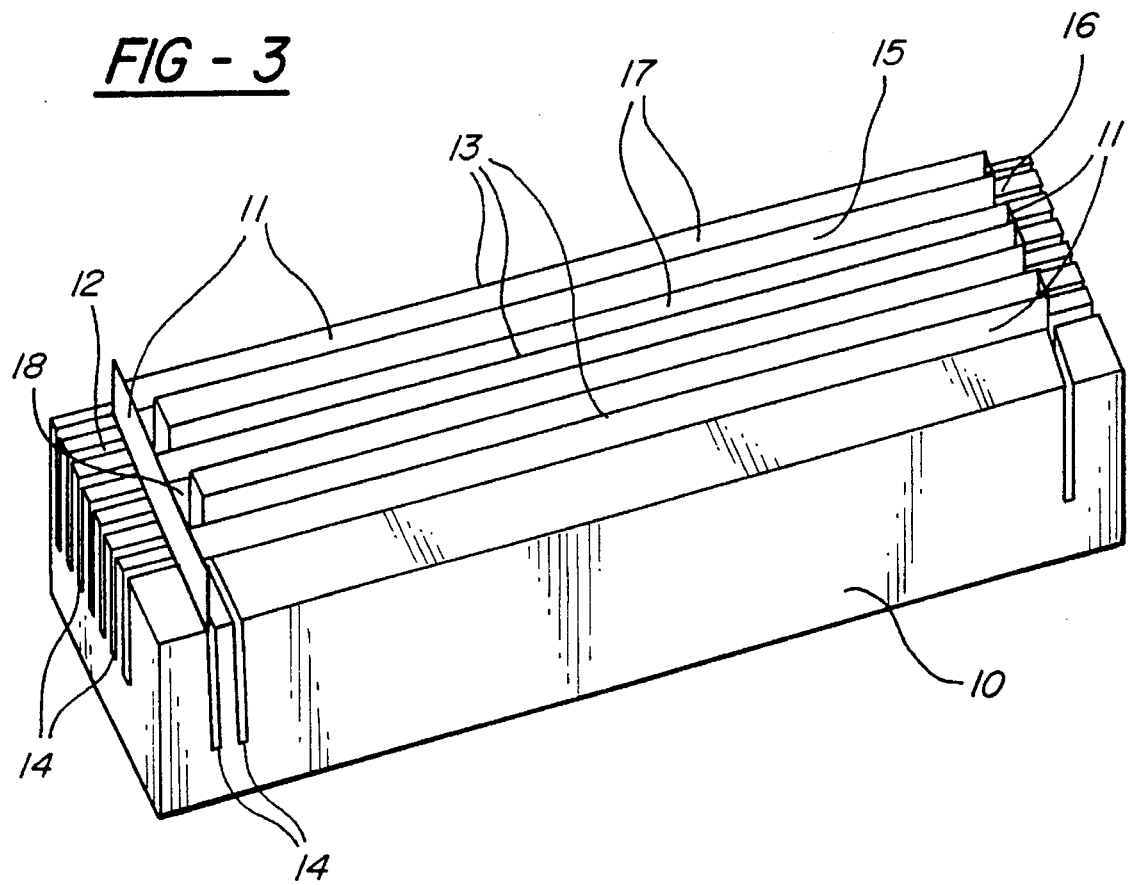
FIG. 3 illustrates one embodiment of this invention which uses a metal frame for the steel rule die system.

FIG. 3 shows one embodiment of the steel rule die system of this invention. A steel rule die frame 10 is constructed from a block of metal. The metal may be steel, stainless steel, aluminum, or other suitable metal which is able to withstand the repeated stress of tonnage pounding on the blades 11 of the frame 10. Grooves or slots 12 are cut in the metal frame 10 using a standard vertical mill machine. The slots 12 do not go completely through the frame 10 as they would in conventional wooden die frames. The blades 11 are placed in the slots 12 such that the edges of the blades opposite the cutting edges 13 rest on the metal bottoms 14 of the slots 12.

In the illustrated blade configuration, shown just as an example, the steel rule die would cut material to form two forked pieces. Each piece of cut material would have a long central slot 15 with an open end 16, and two long extensions 17 joined by a cross piece 18. These forked pieces are used as seal-inserts for the toner hopper openings of toner cartridge asselblies used in printing, copying and facsimile machines. In use, when the seal-insert is attached to the toner hopper a long piece of material would slide through the open end 16 of the slot 15 between the extensions 17 to the cross piece 18, forming a seal.

The blades 11 are welded, brazed, soldered, or otherwise spliced or joined at the ends or corners without fear of damaging the metal frame 10, since the metal frame 10 won't burn as the wooden frame 6 does. Since the metal frame 10 is difficult to damage, less specialized welding or joining equipment may be used to save on costs of manufacture and equipment overhead. Since the blades 11 rest on the bottoms 14 of the slots 12, notching the edges of the blades 11 opposite the cutting edges 13 is unnecessary. This reduces manufacturing costs and provides stronger blades 11. The steel rule die of this invention is easily re-usable, and re-rulable for a greater lifespan than a wooden frame die. The fit of the blades takes longer to loosen, and the tolerances stay within desired limits for greater periods of time.

Cooomputer-directed laser beams are now used to cut holes or slots in metal. But these beams can only cut precisely through metal not thick enough to support steel rule blades. A second embodiment of this invention, illustrated in FIG. 4, allows use of the computer-directed laser beam technology to provide the metal die frame. Slots 19 are cut in the metal frame 20 using the computer-directed laser beam. To provide metal die frames thick enough to support the steel rule blades, multiple metal frame layers 20 are precisely slotted by the computer-directed laser beam, and then joined together by screws 21, bolts, glue, or other suitable means such that the slots 19 accurately match up. The result is a metal die frame of the needed thickness to support the blades, and blades aligned as precisely as possible.

Figure 4:
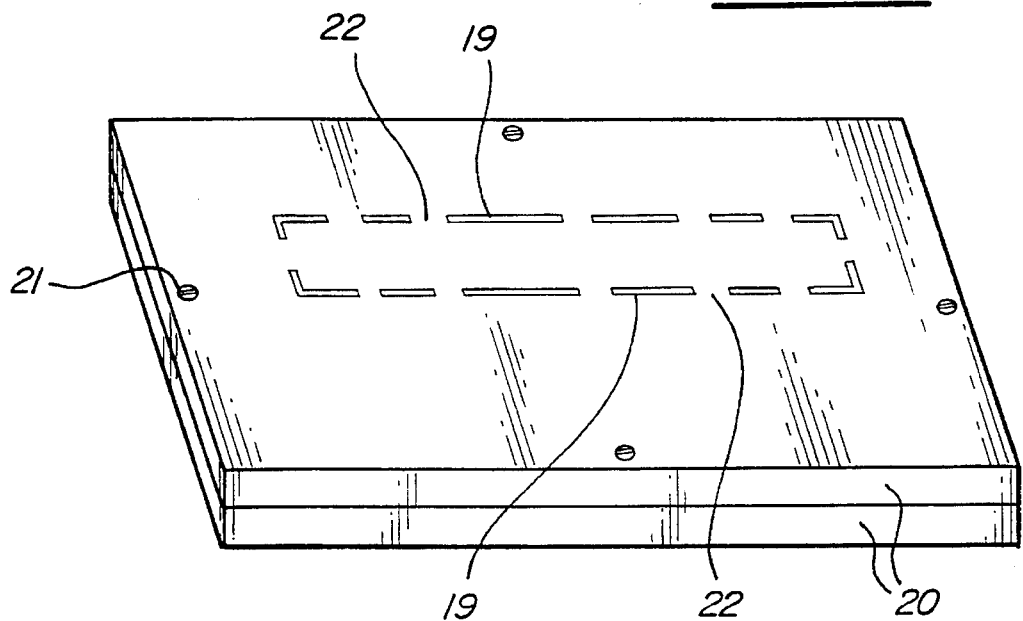
FIG. 4 shows a second embodiment of this invention with the die frame formed from precisely slotted multiple layers of metal.

In the FIG. 4 embodiment, the computer-directed laser beams leave uncut spaces 22 called bridges, along the lengths of the slots 19 so the conventional notched blades shown in FIG. 1 may be used. As shown for simple demonstration purposes, the resulting cut material will have a rectangular shape. The surfaces 5 of the notches 3 in the blades 1 would rest on these bridges 22, fitting and securing the blades in the multiple-layered metal die frame 20.

It is possible, however, to modify this embodiment so a steel rule die is constructed which enables the cut material to fall through the die. By doing this, rubber is not needed between the blades to spring the cut material out of the die, and the cut material does not otherwise have to be pryed or fished out of the die. As shown by top view in FIG. 5, a rectangular shape 23 (as an example) is completely cut from each layer 20 of the metal frame by the computer-directed laser beam technology. The blades 24 of the steel rule die would be brazed, soldered, or welded along the perimeter 25 of the rectangular shape. In the case of the tack-welded steel-rule blades, when re-ruling, the tack welds can be ground down on a grinder, diegrinder or similar tool. When the material is forced onto the die and cut, the cut shape falls through the die frame.

A method of joining the blades 24 to each other in a precise manner before brazing them to the perimeter 25 would be to place the blades 24 in the conventional wooden die frame of FIG. 2 or the metal die frame of FIG. 3. The edges or corners 26 of the blades 24 would then be welded, brazed or soldered together while the blades are supported by these other frames. The resulting blade configuration is very precise and, after removing it from the die frame, it may be easily brazed as one piece to the perimeter 25 of the cut shape in the multiple-layered die frame 20.

Sometimes, after repeated use, hammering and hammering on the blades, the blades 24 loosen and may also pop out of the metal frame formed by the layers 20. Usually, this occurs where the blades bottom dull side may get lower than the bottom of the multilayered metal dieboard. FIG. 6 shows a metal plate or sheet 27 attached to the underside of the metal frame. The underside of the frame is the side of the frame opposite the side from which the cutting edges of the blades 24 extend. The metal plate 27 has no slots or other openings. It completely covers the underside of the metal frame multilayered dieboard and prevents the blades 24 from losening and popping out or protruding from the underside of the metal frame beneath the layers 20. The blades 24 of the die are therefore kept tight, in place and are preventing from being forced below the underside frame surface. The plate 27 may be attached to the metal frame by bolts, screws, glue, or other suitable means.

Figure 7:
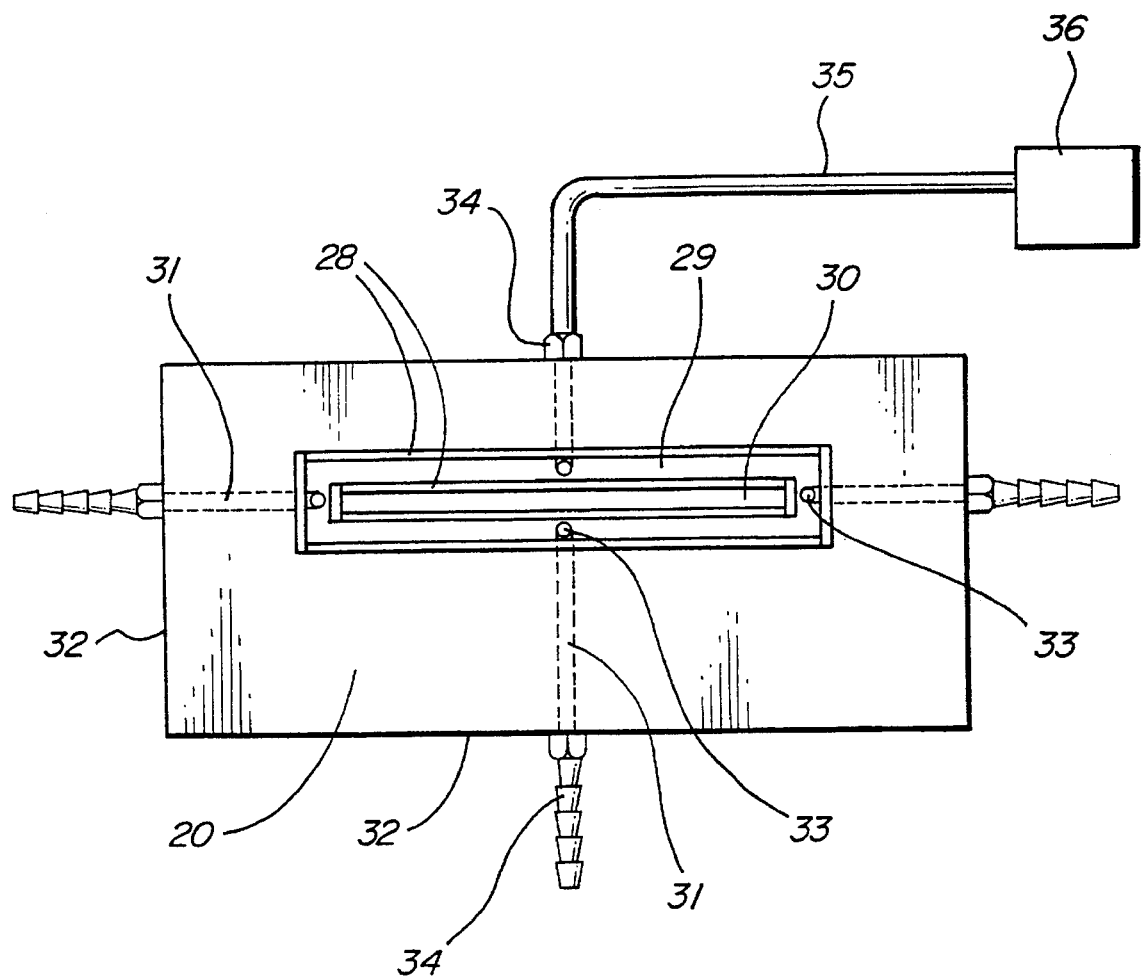
FIG. 7 shows a top view of the metal die frame with a compressed air ejection system for removing the cut work piece from the die.

FIG. 7 shows a modification of the FIG. 5 embodiment. Blades 28 are set up, as an example, in a configuration that would provide a cut work piece in the shape of a rectangular strip 29 with a central open slot 30. Since one could not simply provide an opening such as the rectangular shape 23 of FIG. 5 for the work piece to fall through after being cut, an alternative way is needed to easily remove the cut work piece from the die. There are no openings cut through the metal frame layers 20 of FIG. 7. In the FIG. 7 embodiment, passages 31 are drilled or cut through the frame layers 20 from the sides 32 of the frame to the blade area. Passages 33 are drilled or cut to extend the passages 31 to where the cut work piece would be lying on the frame in the configuration of the blades 28. Connections 34 are provided for connecting air hoses, such as hose 35, from an air compressor 36 to the passages 31 and 33. The air compressor could be connected to, for example, a foot pedal which operates a pneumatic valve to quickly and efficiently control the air flow through the hoses 35 to passages 31 and 33. After the work material is cut and is lying in the die, a blast of air is used to propel the work piece from the die.

With wooden dies, it is not worth the extra effort to drill passages through the die frame. This is because of the limited life expectancy of the wooden die. When one considers the extra effort, and therefore cost, required for compressed air ejection, it is not worth doing for a wooden-framed dieboard of limited life expectancy. The re-rulability of the wooden-framed dieboard is limited, so the extra labor is not practical. However, with the long-life steel rule dieboard system of this invention, it is worth the extra effort and cost to install a compressed air ejection system because the metal frame is long-lasting and will be re-rulable for many cycles.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A method for making a re-rulable steel rule die, said method comprising using a computer-directed laser beam to cut precise slots through multiple metal frame layers, joining said multiple metal frame layers together such that said slots align, inserting blades into said slots to cut work material adjacent a first surface of said joined frame layers, and attaching a plate on a second surface of said joined frame layers opposite said first surface to prevent said blades from protruding from said second surface.

2. A method as in claim 1 wherein said blades are attached to said multiple metal frame layers by interrupting said slots with bridges and providing said blades with notches in edges opposite cutting edges of said blades, whereby when said blades are inserted into said slots said notches have surfaces which rest on said bridges, preventing said blades from falling through said slots of said multiple metal frame layers.

3. A method for making a re-rulable steel rule die, said method comprising using a computer-directed laser beam to cut precise shapes through multiple metal frame layers together such that said shapes align, said aligned shapes forming an opening through said die, said opening having a perimeter, and said method further comprising attaching blades to said perimeter of said opening so when work material is cut by the die said work material falls through said multiple metal frame layers.

4. A method as in claim 3 wherein said blades are attached to said perimeter of said opening by brazing, soldering or welding.

5. A method as in claim 3 wherein said perimeter of said opening has a configuration and said blades have edges where they are to be joined together, and said method further comprises joining said blades to each other at said edges while said blades are supported by another frame in said configuration, and then brazing said joined blades as one piece to said perimeter of said opening in said joined-together multiple metal frame layers.

* * * * *